United States Patent [19]

Brunswick et al.

[11] Patent Number: 4,563,786
[45] Date of Patent: Jan. 14, 1986

[54] SPEED EQUALIZING MEANS AND/OR LAUNDRY MACHINES INCORPORATING THE SAME

[75] Inventors: Robert Brunswick; Warren J. Hancock, both of Melbourne, Australia

[73] Assignee: Fisher & Paykel Limited, Auckland, New Zealand

[21] Appl. No.: 583,602

[22] Filed: Feb. 27, 1984

[30] Foreign Application Priority Data

Mar. 28, 1983 [NZ] New Zealand .................. 203725

[51] Int. Cl.⁴ .............................................. D06F 37/40
[52] U.S. Cl. ........................................ 8/159; 68/23.7
[58] Field of Search ................ 8/159; 68/23.6, 23.7; 74/411; 474/94, 902, 903; 464/30, 42, 160

[56] References Cited

U.S. PATENT DOCUMENTS 3,091,956 6/1963 Brucken et al. .................. 68/23.6
4,165,624 8/1979 Ruble ................................ 68/23.7

Primary Examiner—Philip R. Coe
Attorney, Agent, or Firm—Holman & Stern

[57] ABSTRACT

A laundry machine having an agitator shaft rotatable backwards and forwards by an electronically controlled electric motor when in a washing mode and continuously in one direction when in a spinning mode has the agitator shaft connected to an interconnecting member spaced radially from its axis engageable with a connector for a concentric spin tub shaft to carry the spin tub with it when the spin mode. The connection between the agitator rotating system and the spin tub rotating system are effected through an energy absorbing device which absorbs energy resulting from the change in relative speeds necessary to achieve speed equalization between the two systems.

6 Claims, 3 Drawing Figures

SPEED EQUALIZING MEANS AND/OR LAUNDRY MACHINES INCORPORATING THE SAME

FIELD OF THE INVENTION

This invention relates to speed equalizing means and/or a laundry machine incorporating the same and has been devised particularly though not solely for use in absorbing energy as between a first rotatable member and a second rotatable member substantially stationary in one mode of operation, for example, between the agitator and spin tub drives in an agitating type laundry machine.

BRIEF SUMMARY OF THE INVENTION

It is an object of the present invention to provide a speed equalizing means and/or a method of operating the same, and/or a laundry machine incorporating the same.

Accordingly in one aspect the invention consists in a method of equalizing the speeds of rotation of two coaxial rotatable members one of which includes a spin tub and the other of which includes an agitator and associated shaft of a laundry machine, comprising the steps of interconnecting the rotatable members through interconnecting contacting members spaced radially from the axis of said rotatable members and transmitting the force from at least one of said contacting members to its respective rotatable member through an energy absorbing device so as to absorb energy resulting from the change in relative speeds necessary to achieve speed equalization of said rotatable members.

In a further aspect the invention consists in speed equalizing means for use in equalizing the speeds between two coaxial rotatable members one of which includes a spin tub and the other of which includes an agitator of a laundry machine, said speed equalizing means comprising interconnecting contacting members spaced radially from the axis of said rotatable members, at least one of said contacting members being connected to its respective rotatable member through an energy absorbing device which in use absorbs energy resulting from the change in relative speeds necessary to effect speed equalization of said rotatable members.

In a further aspect the invention consists in a laundry machine which includes an agitator as a first rotatable member and a spin tub as a second rotatable member, and speed equalizing means between said rotatable members according to the preceding paragraph mounted so that relative movement between said agitator and said spin tub greater than a permitted movement results in interconnection of said contacting members.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings wherein.

DETAILED DESCRIPTION

Figure 1:
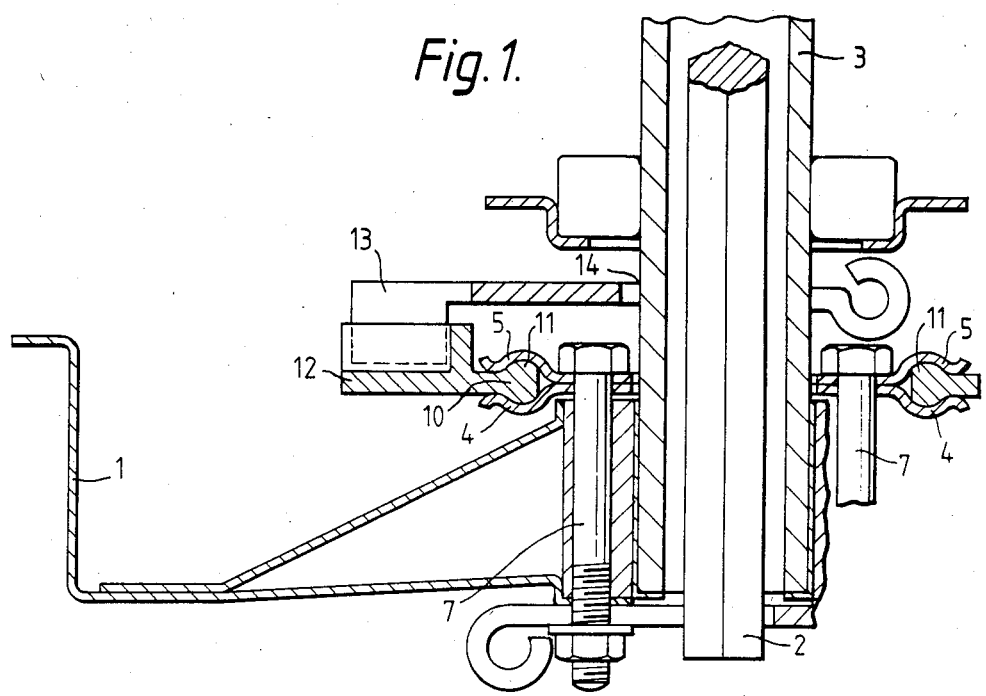
FIG. 1 is a diagrammatic cross-sectional view of part of a laundry machine showig such parts as are necessary to illustrate the present invention.

Referring to the drawings a laundry machine is provided such as that described in our copending New Zealand patent applications Nos. 196638/198577. In such a machine a driving pulley 1 rotates an agitator shaft 2 connected to the agitator of the laundry machine and coaxial with the agitator shaft 2 is a spin tub hollow shaft 3. These two shafts are carried in bearings and rotate or are stationary in accordance with the required washing sequence. An electronically commutated electric motor and associated circuits are provided to oscillate the agitator backwards and forwards over a permitted range of movement (usually less than $2\pi$ radians) in an agitating mode and to drive the agitator and spin basket continuously in one direction in a spin mode. These modes are well known.

The motor and control are preferably such as is described in European Patent Application Publication No. 38694 General Electric Company or less preferably specification U.S. Pat. No. 3,783,359 Bendix.

Figure 2:
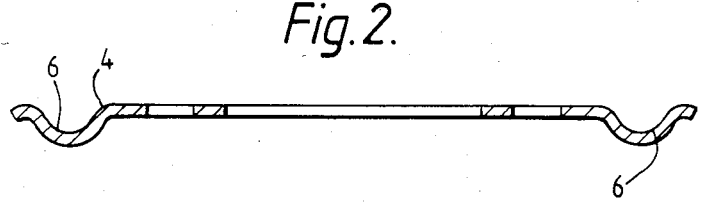
FIG. 2 is a cross-sectional view of a gripping member forming part of a gripping means according to the invention.
Figure 3:
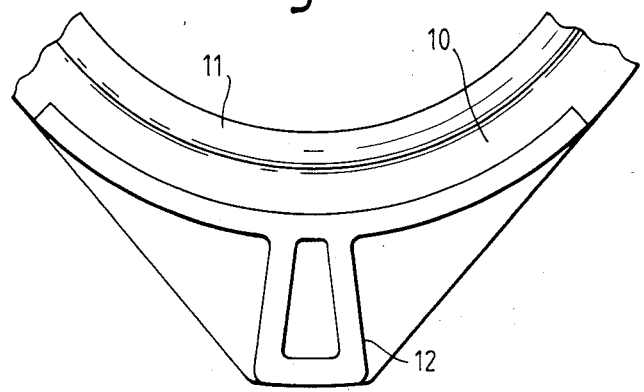
FIG. 3 is a plan top view of part of a sliding member according to the invention.

An energy absorbing device is provided between the rotatable members comprising the shafts 2 and 3 as follows. Associated with the pulley 1 is a gripping means forming parts of the energy absorbing device and gripping a pair of gripping members 4 and 5, one of which is shown in more detail in FIG. 2. Each gripping member includes an annular groove 6 and the two members are bolted together e.g. by assembly bolts 7. Engaged between the grooves 6 in members 4 and 5 in the assembled condition shown in FIG. 1 is a sliding member 10 forming a further part of the energy absorbing device and shown in more detail in FIG. 3. The sliding member 10 has a bulbous member 11 which conforms to and is engaged by the inner surfaces of the grooves 6 and preferably the grooved members 4 and 5 are made of a stiffly resilient material, for example stainless steel, and the sliding member 10 is made of a compressible frictional material, for example, acetal or polyamide material such as a nylon either with or without friction additives. The sliding member 10 is provided with an extension 12 and to provide releasable interengagement between the agitator shaft 2 and the spin tub shaft 3 a driving arm 13 forming one interconnecting contacting member which is fixed to the shaft 3 is engageable with either side of the extension 12, which forms the other interconnecting contacting member being otherwise freely rotatable over very close to a full turn of $2\pi$ radians. Thus the agitator may be agitated almost up to a full turn when in the agitation mode without the arm 13 contacting the extension 12.

In use when the pulley 1 is in the agitating mode of the laundry machine, and is rotated backwards and forwards through a permitted angle, usually only slightly less than $2\pi$ radians, the gripping members 4 and 5, the sliding member 10 and the arm 12 also rotate backwards and forwards through something less than $2\pi$ radians. In the event however that there is some movement of the stationary (in the agitating mode) shaft 3 and consequently arm 13, the arm 12 may in some circumstances engage the arm 13 and to absorb energy as between the rotating member 1 and the stationary but rotatable member 3 the sliding member 10 slides in the grooves 6 of the members 4 and 5. More importantly however, when changing from agitate to spin mode or more, particularly from spin to brake mode, the driving arm 13 must pick up the spin tub shaft 3 at a time when there may be a considerable relative speed difference between the two, so that the energy in the rotating member needs to be absorbed by the frictional engagement between the sliding member 10 and the gripping members 4 and 5. Thus both in the case of inadvertent engagement and deliberate engagement, (but more importantly the latter) because of the stiff resilience of the grooved members 4 and 5 and/or the compressibility of the sliding member 10 there is frictional sliding contact between grooves 6 and the sliding member and this frictional contact absorbs energy due to the engagement of the member 11 with the arm 12. As a result there tends to be a smooth engagement between the two members and the shock of engagement of the members when they contact each other is reduced.

Clearly the frictional resistance offered by the energy absorbing device must be sufficient to enable the transmission of enough energy to accelerate the spin tub to spin speed, to maintain that spin speed without slipping of the sliding member 10 relative to the gripping members 4 and 5 and to resist the forces occurring when braking the spin tub after spinning has occurred. Because braking deceleration must be effected in a much shorter time than acceleration, it will be apparent that the braking forces impose the greatest requirements on the frictional resistance.

The gripping members 4 and 5 and the bulbous member 11 may be reversed i.e. the grooves gripping members 4 and 5 may have ribs instead of grooves and grooves may be provided in the sliding member 10. One or the other of the set of grooves and the bulbous member may be discontinuous e.g. not a full annulus if desired. Although a coacting bulbous member and grooves are described above, other coacting arrangements may be used, e.g. a series of ridges and valleys in both members or one member may be of flat e.g. disc form or one of cylindrical form, the other member coacting with such disc or cylindrical form.

If desired a further energy absorbing device could be inserted between driving arm 13 and the shaft 3, constructed in a similar way to that described above.

It will be seen that by this construction a very simple arrangement results which enables a smoothing of the engagement of the members 12 and 13 one with the other during operation of the laundry machine.

We claim:

1. A method of equalizing the speeds of rotation of two coaxial rotatable members one of which includes a spin tub and the other of which includes an agitator and associated shaft of a laundry machine comprising the steps of:
   interconnecting the rotatable members through interconnecting contacting members spaced radially from the axis of said rotatable members;
   transmitting the force from at least one of said contacting members to its respective rotatable member through an energy absorbing/gripping means associated with one of said rotatable members and a sliding means associated with the other of said rotatable members, there being a relative resilience and/or compressibility as between said gripping means and said sliding means;
   causing said gripping means to grip said sliding means; and
   causing one of said means to slide relative to the other of said means in a manner such that energy resulting from the change in relative speeds necessary to achieve speed equalization of said rotatable members is absorbed by the frictional resistance to rotation between said gripping means and said sliding means.

2. Speed equalizing means for use in equalizing the speeds between two coaxial rotatable members one of which includes a spin tub and the other of which includes an agitator of a laundry machine comprising:
   interengageable contacting members spaced radially from the axis of rotation of the rotatable members; and
   means for attaching said contacting members to respective rotating members;
   at least one of said attaching means comprising an energy absorbing device comprising,
   a gripping means, and a sliding means slidingly engaged with said gripping means,
   one of said gripping means and sliding means being fixedly attached to a respective one of said rotatable members, and the other of said gripping means and sliding means being fixedly attached to one of said contacting members;
   so that relative movement between said rotatable members when said contacting members are interengaged is resisted by friction between said gripping means and sliding means which absorb energy resulting from a change in relative speeds between the rotatable members necessary to effect speed equalization of the rotatable members.

3. Speed equalizing means as claimed in claim 2 wherein:
   said sliding means comprises a bulbous member; and
   said gripping means comprises two gripping means having annular grooves therein which coact with said bulbous member.

4. Speed equalizing means as claimed in claim 3 wherein:
   said two gripping means comprise two annular plate members having radially inner and outer portions thereof, the radially inner portions being attached to said one rotatable member and said annular grooves being in the radially outer portions thereof and facing each other;
   means are provided to hold said annular plate members together; and
   said bulbous member is attached to said one contacting member and slidingly engages in said grooves.

5. Speed regulating means as claimed in claim 4 wherein:
   said sliding means comprises an annular member having radially inner and outer portions;
   said bulbous member comprises an enlarged annular rib in the radially inner portion of said annular member;
   said one contacting member comprises a flange element extending from said annular member having oppositely facing contact surfaces lying in planes extending parallel to the axis of rotation of the rotating members; and
   said other contacting member comprises an arm extending radially from the other rotatable member, and a flange element extending from said arm having oppositely facing surfaces engageable with said surface on said flange on said one contacting member.

6. Speed equalizing means as claimed in claim 2 wherein:

said contacting members are positioned with respect to each other to allow relative rotation of the rotatable members through a predetermined angle in opposite directions without interengagement of the contacting members; and further comprising an electronically commutated electric motor and control circuits therefor operatively connected to the agitator to rotate the agitator through said predetermined angle alternately in opposite directions.

* * * * *